United States Patent [19]

Piegza

[11] 4,334,633
[45] Jun. 15, 1982

[54] ARTICULATED DOOR

[75] Inventor: Henry J. Piegza, Clarence, N.Y.

[73] Assignee: WSF Industries, Inc., Tonawanda, N.Y.

[21] Appl. No.: 251,170

[22] Filed: Apr. 6, 1981

[51] Int. Cl.³ .................... B65D 43/14; B65D 51/04
[52] U.S. Cl. .................................. 220/332; 220/211;
220/333; 49/199; 49/205; 49/248; 49/340;
49/246; 49/255
[58] Field of Search ..................... 220/211, 332, 333;
49/197, 204, 199, 205, 248, 254, 246, 255, 340

[56] References Cited

U.S. PATENT DOCUMENTS

2,954,141  9/1960  Kramer et al. ................... 220/211
4,119,238 10/1978  Ja'afar et al. ..................... 220/211

Primary Examiner—George T. Hall
Attorney, Agent, or Firm—Bean, Kauffman & Bean

[57] ABSTRACT

An improved mechanism is disclosed for use in mounting a door on a pressure vessel for opening and closing movements in a manner permitting minimum clearing distances to be maintained between obstructions and the front or sides of such vessel.

10 Claims, 10 Drawing Figures

ARTICULATED DOOR

BACKGROUND OF THE INVENTION

Various mechanisms have been proposed for use in mounting a door of a vessel for opening and closing movements in a manner requiring minimum floor space in front of the vessel and/or permitting minimum clearance distances to be maintained between obstructions and the front or sides of such vessel. As by way of example, reference may be made to prior U.S. Pat. Nos. 2,507,522; 2,529,478; 2,601,566; 2,639,144; 2,639,601; 2,923,430; and 3,067,986.

SUMMARY OF THE INVENTION

The present invention is directed towards an improved door mounting mechanism for a pressure vessel, and more particularly to a mechanism of this type permitting door opening and closing movements within obstacle clearance distances not heretofore possible.

In a preferred construction, a door is guided for movement lengthwise of a vessel between closed and partially open positions under the control of pairs of support and control arms having their opposite ends pivotally coupled to the vessel and the door, respectively, for relative movement about four parallel axes; and thereafter swung under the control of a separating operating means between its partially open position and an open position in which it lies closely adjacent the side wall of the vessel.

The invention allows for controlled tilting of the door, during movement between closed and partially open position, in order to orient the door in a manner permitting a minimum clearance spacing to be constantly maintained between the door and vessel during subsequent movement of the door into open position, as required to minimize required clearance distances between obstacles and the front and side wall of the vessel. The invention additionally features a control circuit providing for uniform operation of the support and control arms of each pair thereof in order to prevent unequal displacement of opposite sides of the door with which they are associated during movement thereof between closed and partially open positions.

DRAWINGS

The nature and mode of operation of the present invention will now be more fully described in the following detailed description taken with the accompanying drawings wherein.

DETAILED DESCRIPTION

Figure 1:
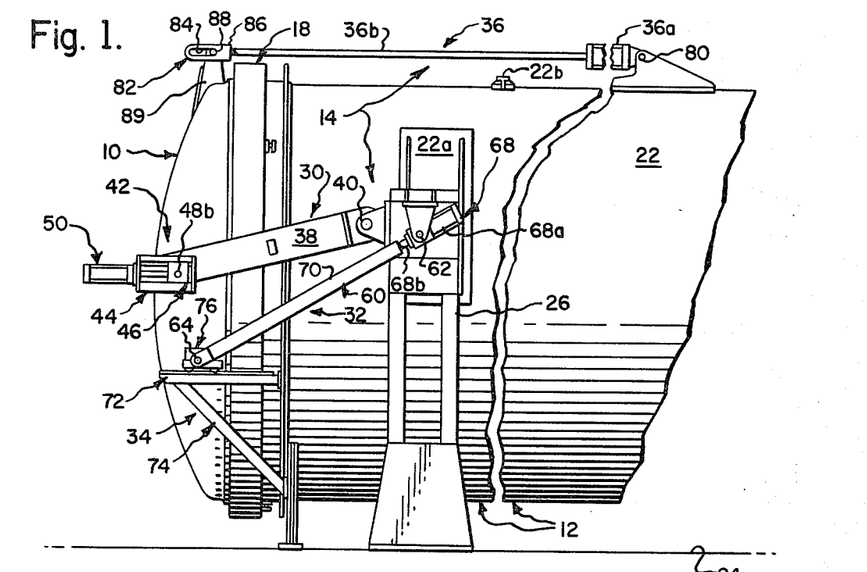
FIG. 1 is a partial, side elevational view of a pressure vessel incorporating the present invention with a door of the vessel shown in closed condition.
Figure 2:
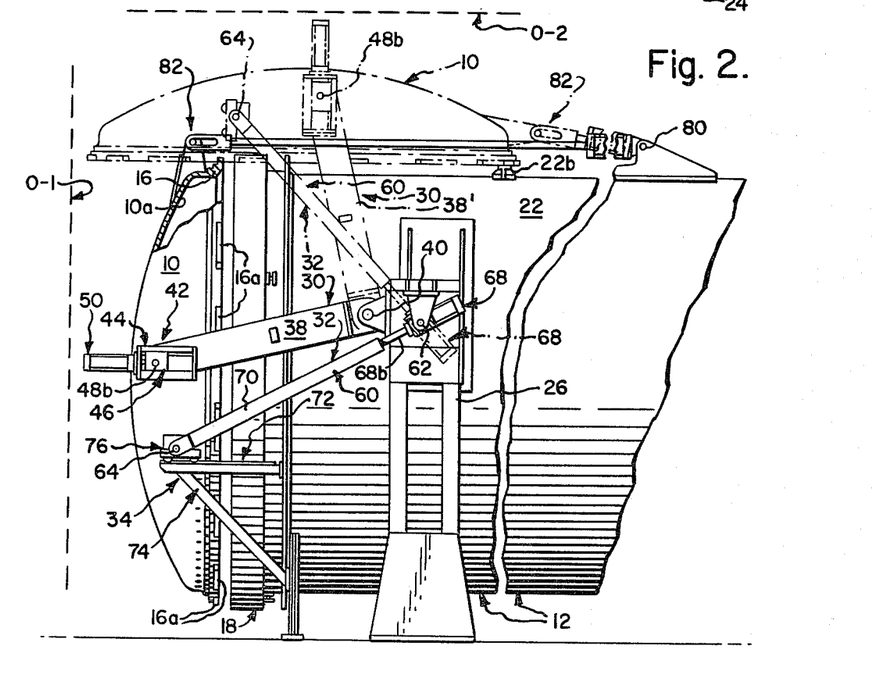
FIG. 2 is a view similar to FIG. 1, but showing the door in partially open position.
Figure 3:
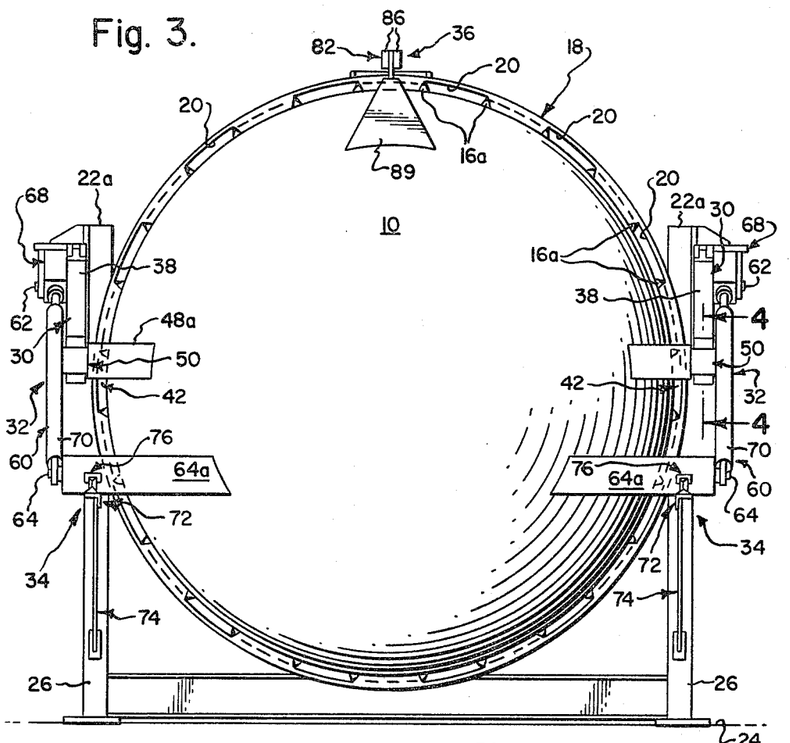
FIG. 3 is an end elevational view of the vessel shown in FIG. 1.

Reference to now made primarily to FIGS. 1 through 3, wherein a conventional dome or generally hemispherically shaped door or closure 10 is shown as being movably mounted for selectively closing an open end, not shown, of a conventional pressure vessel 12 by a door mounting mechanism 14 formed in accordance with the present invention.

Door 10 is depicted in the drawing as being a quick opening type door of the type shown for instance in commonly assigned U.S. Pat. Nos. 3,488,883 and 3,744,402. More specifically, door 10 may be characterized as having a concave inner surface 10a bounded by an annular locking rim portion 16 provided with a plurality of locking lugs 16a spaced peripherally thereof. A locking ring 18 formed with a plurality of annularly spaced recess openings 20 is supported by vessel 12 for rotation between a door release position generally depicted in FIG. 2 and door locking position generally depicted in FIGS. 1 and 3. In door release position, recess openings 20 are arranged to removably receive lugs 16a incident to movement of door 10 axially of vessel 12 between its closed and partially open positions shown in FIGS. 1 and 2, respectively. When door 10 is in its closed position and locking ring 18 is rotated relative to the vessel into its locking position, lugs 16a are captured within the locking ring and locking rim portion 16 is clamped against an annular sealing surface, not shown, which bounds the open end of the vessel. Suitable means, such as fluid cylinder devices, not shown, may be employed to effect locking and unlocking rotations of locking ring 18.

Vessel 12 is depicted in the drawings as including a side wall or casing 22 whose open end is to be closed by door 10 and which may be supported relative to a floor or other suitable ground support 24 in any desired manner, such as by a suitable framework shown in part as including floor mounted pedestals 26,26. It will be understood that side wall 22 may be of any desired size, cross-sectional configuration and length depending upon the proposed use of vessel 12. In a like manner, the opposite end of the vessel, not shown, may be permanently closed by an end wall or selectively closed by a door similar to door 10, as desired.

In a first form of the present invention, which will hereinafter be described with particular reference to FIGS. 1 through 7, mounting mechanism 14 is employed to support door 10 for movement between its closed position shown in FIG. 1 and a fully open position shown in broken line in FIG. 2, wherein the door is disposed above vessel 12 and arranged closely adjacent side wall 22. In this form of the invention, mechanism 14 generally includes a pair of main support arm assemblies 30, 30; a pair of control arm assemblies 32, 32; a door guide means, which is preferably in the form of a pair of door guide assemblies 34, 34; and a mechanism 36 for swinging the door between its partially open and open positions. In the vertically swinging door mounting arrangement illustrated in FIGS. 1-3, the support arm, control arm and guide assemblies would be mounted adjacent horizontally opposite sides of side wall 22 and mechanism 36 would be arranged adjacent the top of the side wall and within a plane extending lengthwise of and vertically bisecting such side wall.

Figures 4, 5, 6:
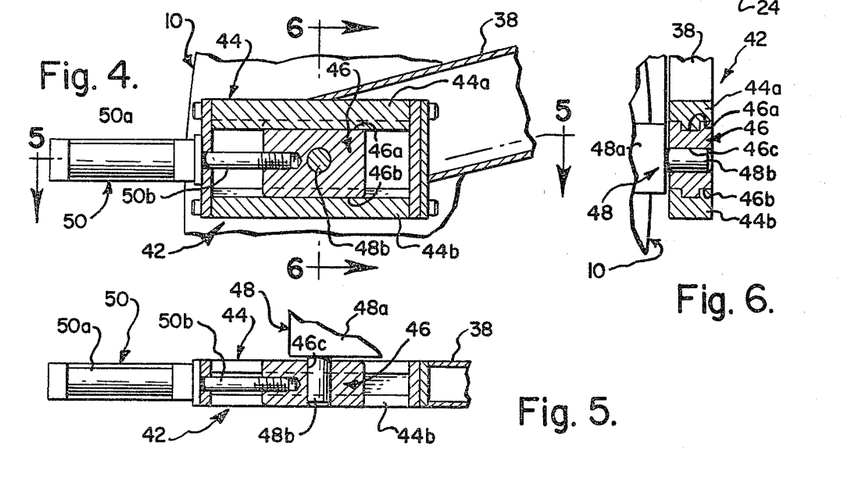
FIG. 4 is a sectional view taken generally along the line 4—4 in FIG. 3.
FIG. 5 is a sectional view taken generally along the line 5—5 in FIG. 4.
FIG. 6 is a sectional view taken generally along the line 6—6 in FIG. 4.

More specifically, support arm assemblies 30, 30 include a pair of support arms 38, 38 having first ends fixed to pedestals 26, 26 and/or weldments 22a, 22a fixed to side wall 22 by a pair of axially aligned pivot or bearing pins 40, 40 for pivotal movements about a first axis, which extends horizontally and transversely of vessel side wall 22; and second ends fixed to door 10 by a pair of slide mechanisms 42, 42. Each of slide mechanisms 42, 42 include, as best shown in FIGS. 4-6, a guide device 44, which is suitably fixed, as by welding, to its associated support arm 38 and includes upper and lower guide elements 44a and 44b; a guide follower 46 having upper and lower surfaces 46a and 46b, which are shaped and sized for sliding surface engagement with guide elements 44a and 44b, respectively; and bearing means 48 for coupling door 10 to guide follower 46 and thus the second end of its associated support arm 38. Bearing means 48 may be variously defined, such as providing door 10 with a weldment 48a, which serves to rigidly mount a pivot or bearing pin 48b sized to be rotatably received within a bore opening 46c formed in guide follower 46. It will be understood that the bearing pin 48b, 48b of slide mechanisms 42, 42 are disposed in axial alignment and permit relative pivotal movement between door 10 and control arms 38, 38 about a second axis disposed parallel to the first axis defined by pivot pins 40, 40.

By again making reference to FIGS. 3, 4 and 5, it will be understood that an operator device 50 is associated with each of slide mechanisms 42, 42 for the purpose of effecting reciprocating movements of its associated guide follower 46 lengthwise of its associated guide device 44 and thus door 10 between the first and second positions thereof shown in FIGS. 1 and 2; such first and second positions of the door relative to the support arms corresponding respectively to the closed and partially open positions of the door. Operator devices 50, 50 may be variously defined, but preferably are in the form of hydraulically operated cylinder devices including a cylinder portion 50a rigidly fixed to its associated guide device 44 and a piston-rod portion 50b, which has its free end threadedly or otherwise rigidly fixed to its associated guide follower 46.

Control arm assemblies 32, 32 include a pair of extensible control arms 60, 60 having first ends fixed to pedestals 26, 26 and/or weldment 22a, 22a by a pair of aligned pivot or bearing pins 62, 62 for pivotal movement about a third axis; and second ends fixed to opposite sides of door 10 by a pair of aligned pivot or bearing pins 64, 64 carried by door weldments 64a, 64a for pivotal movements about a fourth axis. It will be understood that the third and fourth axes extend horizontally and transversely of vessel side wall 22 and are disposed parallel to the above mentioned first and second axes. Also, it will be understood that the first and third axes are positionally fixed relative to side wall 22, whereas the second and fourth axes are positionally fixed relative to door 10.

Control arms 60, 60 are rendered extensible in accordance with the illustrated form of the present invention by fitting same with second operator devices 68, 68, which are preferably in the form of hydraulic cylinder devices having cylinder portions 68a, 68a carried by pivot pins 62, 62 and piston-rod portions 68b, 68b, which are rigidly fixed to and form extensions of outer arm portions 70, 70.

Door guide assemblies 34, 34 are best shown in FIGS. 1-3 as including a pair of stationary guide rails 72, 72, which are suitably fixed relative to vessel side wall 22, as by brackets 74, 74; and a pair of trolley devices 76, 76, which are preferably fixed to door weldments 64a, 64a. As will be apparent from viewing FIGS. 1 and 2, guide rails 72, 72 are of a length sufficient to provide support for trolley devices 76, 76, during movement of door 10 between its closed and partially open positions. The trolley devices may be provided with guide rail engaging wheels or slide bearing elements, as desired.

Mechanism 36 is preferably in the form of a hydraulic cylinder device having a first end, such as that defined by cylinder portion 36a, pivotally fixed to side wall 22 by a pivot pin 80; and a second end portion, such as that defined by piston-rod portion 36b, coupled to door 10 by a lost motion pin-slot device 82 in a manner permitting free reciprocating movement of the door relative thereto incident to movement of the door between its closed and partially open positions and for pivotal movement relative thereto incident to movement of the door between its partially open and open positions. Pin-slot device 82 may be defined by a slot 84 formed in a head end portion 86 fixed to piston-rod portion 36b and a pivot pin 88 carried by door mounted weldment 89, which is arranged adjacent the top of door 10 and horizontally intermediate weldments 48a, 48a and 64a, 64a. It will be understood that the pivot axes defined by pivot pin 80 and device 82 are disposed parallel to the above mentioned first, second, third and fourth axes.

Figure 7:
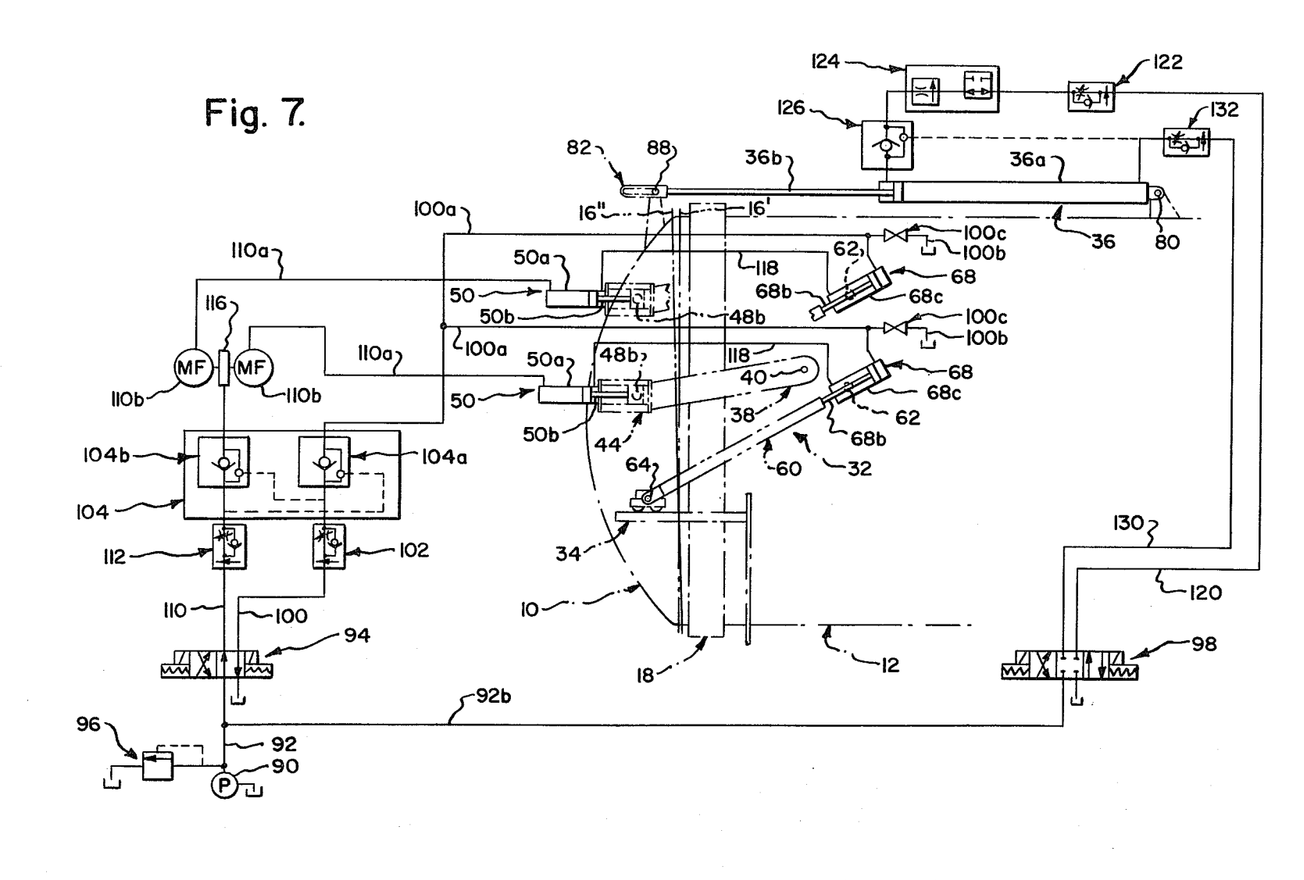
FIG. 7 illustrates a control circuit of the present invention.

Reference is now made to FIG. 7, wherein the schematic illustration of hydraulic control circuit employed in the practice of the present invention is superimposed on a broken line showing of vessel 12 with door 10 disposed in its closed position. The control circuit includes a suitable source of hydraulic fluid under pressure, such as may include a pump 90 connected with a primary flow conduit 92 leading to a four way two-position, directional control valve 94. Conduit 92 may be branched, as at 92a, for return of hydraulic fluid to a sump through a suitable relief valve 96; and branched, as at 92b, for the purpose of supplying hydraulic fluid to cylinder device 36 via a four way three-position, directional control valve 98 in the manner to be described. Valve 94 is disposed in flow communication with first ends of hydraulic cylinder devices 68, 68 via a conduit 100 in which is disposed a pressure compensated, constant flow control valve 102 and one-half 104a of a dual pilot operated check valve 104; and branch conduits 100a, 100a. Branch conduits 100a, 100a are in turn branched, as at 100b, 100b for communication with the sump via suitable pressure release valves 100c, 100c. Control valve 94 is also disposed in flow communication with first ends of cylinder devices 50, 50 via a conduit 110 in which is disposed a pressure compensated constant flow control valve 112 and the other half of 104b of dual pilot operated check valve 104; and branch conduits 110a, 110a with which are associated metering devices 110b, 110b operably coupled by a suitable mechanism 116 to insure the presence of equal flow rates within the branch conduits 110a, 110a. The second or common ends of cylinder devices 50, 50 and 68, 68 are placed in constant flow communication by conduits 118, 118. It will be understood that halves 104a and 104b of valve 104 include ball checks for blocking return flow of fluid from the first ends of cylinder devices 68, 68 and 50, 50 to the sump through conduits 100 and 110, respectively; and bypass devices, which permit such return flow, but only upon the introduction by pump 90 of pressurized fluid into conduits 110 and 100, respectively.

Again referring to FIG. 7, it will be seen that the directional control valve 98 is disposed in flow communication with a first end of cylinder device 36 by a conduit 120 with which is associated a pressure compensated, constant flow control valve 122; a velocity fuse 124; and a single pilot operated check valve 126. Directional control valve 98 is also disposed in flow communication with a second end of cylinder device 36 by a conduit 130 with which is associated a pressure compensated, constant flow control valve 132. Velocity fuse 124 is adapted to block flow of fluid from the first end of cylinder device 36 upon sensing of a predetermined high rate of flow through conduit 120, such as would be encountered in the event of rupture thereof, during swinging of the door towards its partially open position. Valve 126 is similar in construction to valve halves 104a and 104b in that it includes a ball check for normally preventing return flow of fluid from the first end of cylinder device 36 to the sump and a bypass device, which is responsive to the introduction of fluid under pressure into conduit 130 for establishing a flow bypass around its associated ball check.

The mode of operation of mounting mechanism 14 will now be described by first making reference to FIGS. 1 and 7 wherein door 10 is shown as being in its closed condition; cylinder devices 50, 50 and 68, 68 are shown as being in their fully extended and retracted conditions, respectively; and cylinder device 36 is shown as being in its fully extended position. At this point in time, locking ring 18 would normally be in its locking position for the purpose of positively clamping door 10 in its closed condition.

The hydraulic control circuit illustrated in FIG. 7 may be automatic or manually controlled, as desired. When automatic circuit is desired, an associated electrical circuit, not shown, would include limit switches for use in automatically controlling the condition of the directional control valves 94 and 98 in addition to circuitry otherwise employed in connection with control of the operation of pump 90 and various safety indicators, which would preferably be employed to visually indicate to an operator when door 10 is in its respective closed, partially open and open positions. However, the basic operation of the control system would be the same, regardless of whether the control is fully automatic or manual in nature. In this regard, door 10 may be moved from its closed to its partially open position, subsequent to placement of locking ring 18 in its unlocked position, by operation of directional control valve 94 to place conduits 92 and 100 in flow communication and thereby supply hydraulic fluid under pressure to the first ends of cylinder devices 68, 68. As an incident to the establishment of flow in conduit 100, a bypass is established around the check valve provided in check valve half 104b in order to place branch conduits 110a, 110a and thus the first ends of cylinder devices 50, 50 in flow communication with the sump through conduit 110. As hydraulic fluid is introduced into the first ends of cylinder devices 68, 68 piston rod portions 68b, 68b are forced to extend with the result that hydraulic fluid is forced from the second ends of cylinder devices 68, 68 for flow through conduits 118, 118 into the second or common ends of cylinder devices 50, 50. As a result, cylinder devices 50, 50 are caused to retract and force hydraulic fluid from their first ends to flow to the sump through branch conduits 110a, 110a and conduit 110. Operation of cylinder devices 50, 50 and 68, 68 in this manner serves to progressively move apart or separate pivot pins 48b and 64 relative to their associated pivot pins 40 and 62, respectively, until door 10 reaches its partially open position shown in FIG. 2, which may be variously defined, such as by having cylinders 50, 50 or 68, 68 bottom cut. Control valve 94 will remain energized for the purpose of maintaining communication between conduits 92 and 100 during the remaining stage of door opening movement to be described and thereafter during door closing movements until the door is again placed in its partially open position, thereby to effectively lock cylinder devices 68, 68 in their fully extended positions and to lock cylinder devices 50, 50 in their fully retracted positions.

Placement of door 10 in its partially open position may be suitably sensed, as by a limit switch, not shown, for the purpose of giving an operator notice that this position of the door has been reached and/or for automatically energizing control valve 98 for the purpose of placing conduit 120 in flow communication with conduit 92b and conduit 130 in flow communication with the sump in order to initiate contraction of cylinder device 36 and resultant swinging movement of door 10 towards its open position. During swinging movement of door 10 towards open position, the opposite ends of cylinder device 36 are free to undergo pivotal movement about pivot pins 80 and 88 relative to vessel side wall 22 and door 10, respectively; the opposite ends of support arms 38 are free to undergo pivotal movement about the axes of pivot pins 40, 40 and 48b, 48b relative to the vessel side wall and the door, respectively; and the opposite ends of control arms 60, 60 are free to undergo pivotal movement about the axes of pivot pins 62, 62 and 64, 64 relative to the vessel side wall and the door, respectively. With this arrangement, door 10 is caused to follow a path of travel which permits the upper or leading portion of locking rim portion 16 to move above and clear the upper portion of locking ring 18, whereupon the locking ring enters relatively within the door cavity in which it remains and follows a path closely adjacent door inner surface 10a until the door has essentially attained its open position shown in broken line in FIG. 2. In door open position, which may be variously defined such as by engagement of locking rim portion 16 with vessel side wall mounted abutment 22b, the door is disposed in immediate proximity and adjacent side wall 22. By referring to FIG. 2, it will be understood that the door mounting mechanism of the present invention permits door 10 to be moved between its closed and open positions, while requiring minimum clearance distances between obstructions spaced from the front and transversely of the side wall of vessel 12, such as those obstructions generally designated as 0-1 and 0-2, respectively. While such minimum clearance distances will vary substantially depending upon the diameter of door 10, they nonetheless may be substantially less than minimum clearance distances required by prior door mounting mechanisms of which I am aware.

Door 10 may be returned to its closed position by initially operating control valve 98 in order to place conduit 130 in flow communication with conduit 92b and conduit 120 in communication with the sump. Incident to the introduction of fluid pressure into conduit 130, a bypass is established around the ball check included in pilot operated valve 126 in order to permit flow of fluid through conduit 120 to the sump; this operation permitting return of cylinder device 36 to its fully extended condition and the swinging of door 10 downwardly into its intermediate open position. Upon the sensing of the presence of door 10 in its intermediate open position, control valve 98 may be automatically or manually returned to its initial position shown in FIG. 7, and control valve 94 thereafter operated to return same to its initial condition shown in FIG. 7, whereby to establish flow communication between conduits 92 and 110 and between conduit 100 and the sump. Fluid passing through conduit 110 is introduced into the first ends of cylinder devices 50, 50 and as a result, these cylinder devices are forced to extend and effect transfer of fluid to the second or common ends of their associated cylinder devices 68, 68. Fluid displaced from the first ends of cylinder devices 68, 68 is permitted to flow through branch conduits 100a, 100a to conduit 100 and thus to the sump by the bypass created around the ball check of valve part 104a incident to the introduction of fluid into conduit 110. The operation is completed upon seating of door 10 in its closed position, which may be suitably sensed prior to operation of locking ring 18 and movement of same into its door locked position.

It will be noted that during movements of door 10 between its closed and partially open positions, metering devices 110b, 110b cooperate to insure the presence of equal rates of flow of fluid alternately from and to the first ends of cylinder devices 50, 50, such that displacements of opposite sides of the door are uniform, during both opening and closing movements. It will also be noted that placement of the second or common ends of associated ones of cylinder devices 68 and 50 in flow communication insures that each associated pair of cylinder devices is matched, as required to produce a desired orientation of door 10 incident to movement thereof between its closed and partially open positions. In this respect, it will be understood that by selectively controlling the diameters/lengths of cylinder portions 50a and 68a and the diameters of piston head and rod portions 50b and 68b of each associated pair of cylinder devices 50 and 68, such cylinder devices may be extended and retracted, respectively, in a manner permitting the orientation of the door when in its partially open position to be selectively controlled. More specifically, cylinder devices 50 and 68 may be relatively sized such that the axes of pivot pins 48b and 64 at each side of the door are translated through the same distance, during door opening movements, such that the door, when in partially open position, is disposed parallel to the position it assumes in closed position, as indicated by the broken line showing of the inner surface of the locking rim portion designated as 16' in FIG. 7. Alternately, it is contemplated that cylinder devices 50 and 68 may be sized, for instance, to provide for a greater displacement of pivot pins 48b, 48b than that of pivot pins 64, 64 such that door 10 is progressively tilted, during its opening movement until the inner face of the locking rim portion is arranged in the tilted position generally designated as 16" in FIG. 7, wherein the leading portion of the locking rim portion is spaced from locking ring 18 through a greater distance than the trailing portion thereof in the direction of swinging movement of the door towards its open position. By controlled, progressive tilting of door 10, as it is moved axially away from the open end of side wall 22, locking rim portion 16 may be initially removed from within the confines of locking ring 18 and finally positioned such that the leading portion of the locking rim portion is positioned/spaced from the locking ring to avoid engagement therebetween, as door 10 is swung towards open position. Tilting of door 10 in this manner may be required by certain door sizes/geometries and/or when the spacing or clearance between obstruction 0-1 and the front of vessel 12 is at a minimum less than that generally shown in FIG. 2.

Figure 8:
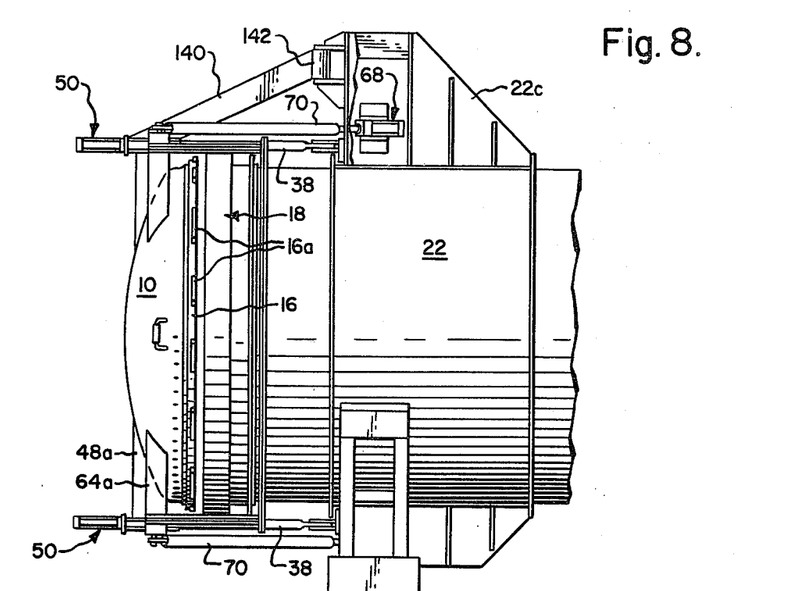
FIG. 8 is a view similar to FIG. 2, but showing an alternative form of the present invention.
Figures 9, 10:
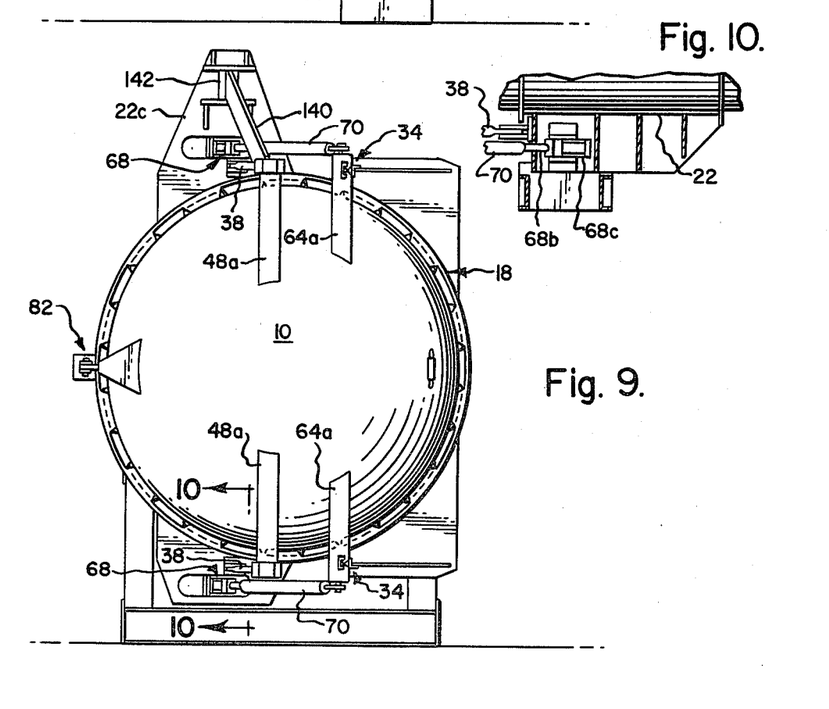
FIG. 9 is an end elevational view of the vessel shown in FIG. 8.
FIG. 10 is a sectional view taken generally along line 10—10 in FIG. 9.

Reference is now made to FIGS. 8–10, wherein the door mounting mechanism of the present invention is shown as mounting door 10 for horizontal swinging movements between its partially open and open positions. The mounting mechanism shown in these figures is identical in construction and mode of operation to that previously described with the exception that it is desirable to brace the linkage defined by support arms 38, 38 by the provision of a bracket 140 having its lower end fixed, as by welding, to the uppermost support arm and having an opposite end fixed for pivotal movement relative to vessel side wall weldment 22c by a pivot and/or bearing device 142, whose axis is arranged in alignment with the axes of pivot pins 40, 40. This type of door mounting arrangement would be employed wherein the head room or spacing between the vessel and an upper obstruction 0-2 is less than required to permit swinging movement of door 10 vertically into its open position shown in FIG. 2.

Various additional changes and modifications of a preferred form of the present invention will likely occur to those skilled in the art upon consideration of the foregoing description and accordingly, I wish the scope of protection afforded the present invention to be limited only by the appended claims.

I claim:

1. In a pressure vessel having a side wall and an opening formed in one end of said side wall, a door for closing said opening, said door being characterized as having a cavity intended to face inwardly of said vessel when said door is in closed position and defined by a concave inner surface bounded by a locking rim portion, a locking ring mounted on said side wall adjacent said opening for rotation between a locking position, wherein it is adapted to enclose and engage with said locking rim portion for locking said door in said closed position, and a release position, wherein it frees said locking rim portion for movement from within the confines thereof in a direction axially of said one end of said side wall, and means for mounting said door for movement successively between said closed position and a partially open position, wherein said door is spaced axially from said one end of said side wall with said locking rim portion removed from within the confines of said locking ring and said door extends generally transversely of said side wall, and between said partially open position and open position, wherein said inner surface of said door is arranged to face relatively towards said side wall with said door having been swung through an arc of approximately 90 degrees from the position it assumes when in said closed position, the improvement for minimizing the clearance distances between obstructions spaced from said one end of said side wall and transversely of said side wall required to permit movement of said door between said closed and open positions, wherein said means for mounting said door comprise in combination:

guide means for guiding said door for movement essentially lengthwise of said side wall between said closed position and said partially open position;

a pair of support arms having first and second ends;

a pair of control arms having first and second ends;

a pair of bearing means for mounting said first ends of said support and control arms for pivotal movement about a pair of parallel axes positionally fixed relative to said side wall and extending transversely thereof;

a pair of other bearing means for mounting said second ends of said support and control arms for relative pivotal movement about another pair of parallel axes positionally fixed relative to said door and disposed parallel to the first said pair of axes;

means to effect simultaneous relative separating movements of said other bearing means relative to said bearing means for moving said door along said guide means between said closed and partially open positions, said bearing means and said other bearing means associated with said support arms and control arms being spaced apart first and second relative distances when said door is disposed in said closed and partially open positions, respectively, the last said means including means for selectively retaining said bearing means and said other bearing means spaced apart at said second relative distance; and means for moving said door from said partially open position into said open position, as an incidence to which said bearing means and other bearing means are retained in said second relative distance and said first ends of said support and control arms undergo pivotal movement relative to said side wall about the first said pair of axes and said second ends of said support and control arms undergo pivotal movement relative to said door about said other pair of axes.

2. The improvement according to claim 1, wherein said means for effecting simultaneous relative separating movements includes first hydraulic cylinder devices associated with said support arms and second hydraulic devices associated with said control arms, said first and second cylinder devices of associated ones of said support and control arms having common ends thereof disposed in flow communication one with the other and opposite ends thereof alternately, selectively coupled for flow communication with a hydraulic fluid source and sump, respectively.

3. In a pressure vessel having a side wall and an opening formed in one end of said side wall, a door for closing said opening, said door being characterized as having a cavity intended to face inwardly of said vessel when said door is in closed position and defined by a concave inner surface bounded by a locking rim portion, a locking ring mounted on said side wall adjacent said opening for rotation between a locking position, wherein it is adapted to enclose and engage with said locking rim portion for locking said door in said closed position, and a release position, wherein it frees said locking rim portion for movement from within the confines thereof in a direction axially of said one end of said side wall, and means for mounting said door for movement successively between said closed position and a partially open position, wherein said door is spaced axially from said one end of said side wall with said locking rim portion removed from within the confines of said locking ring and said door extends generally transversely of said side wall, and between said partially open position and open position, wherein said inner surface of said door is arranged to face relatively towards said side wall with said door having been swung through an arc of approximately 90 degrees from the position it assumes when in closed position, the improvement for minimizing the clearance distances between obstructions spaced from said one end of said side wall and transversely of said side wall required to permit movement of said door between said closed and open positions, wherein said means for mounting said door comprise in combination:

guide means for guiding said door for movement essentially lengthwise of said side wall between said closed and said partially open position;

means for moving said door along said guide means between said closed and partially open positions, while simultaneously progressively tilting said door about an axis extending transversely of said side wall to position a leading portion of said locking rim portion facing in the direction of swinging movement of said door between said partially open and open positions at a distance from said locking ring greater than that of a trailing portion of said locking rim portion of said door relative to said direction of swinging movement, said given distance being sufficient to remove said leading portion from engagement with said locking ring during subsequent swinging movement of said door between said partially open and open positions, and for subsequently swinging said door between said partially open and open positions along a path of travel throughout substantially the whole of which said locking ring is received within said cavity to arrange said door immediately adjacent said side wall when in said open position.

4. In a pressure vessel having a side wall with an opening through one end of said side wall, a door for closing said opening, locking means for selectively securing said door in opening closed position and means for mounting said door for movement between said closed position and an open position, the improvement wherein said means for mounting said door comprises:

guide means for guiding said door for movement essentially lengthwise of said side wall between said closed position and a partially open position in which said door is spaced from said one end of said side wall and removed from within the confines of said locking means;

a pair of support arms having first and second ends;

means for mounting said first ends of said support arms for pivotal movement about a first axis extending transversely of said side wall;

means for mounting said door on said second ends of said support arms for relative reciprocating movement between first and second positions and for relative pivotal movement about a second axis disposed parallel to said first axis, said door assuming said first and second positions relative to said second ends of said support arms when said door is in said closed and partially open positions, respectively;

a pair of extensible control arms having first and second ends, said control arms having contracted and extended conditions when said door is in said closed and partially open positions, respectively;

means for mounting said first ends of said control arms for pivotal movement about a third axis disposed parallel to said first axis;

means for mounting said door on said second ends of said control arms for pivotal movement relative thereto about a fourth axis disposed parallel to said first axis;

first operating means for moving said door between said first and second positions, while effecting change of said control arms between said contracted and extended conditions, for moving said door between said closed and partially open positions; and second operating means for moving said door between said partially open position and said open position in which said door is disposed adjacent said side wall.

5. The improvement according to claim 4, wherein said means for mounting said door on said second ends of said support arms includes guide devices carried by said second ends of said support arms, guide followers slidably supported by said guide devices for reciprocating movement relative thereto and bearing devices for coupling said door to said guide followers for conjunctive reciprocating movements with said guide followers and for rotational movements relative thereto about said second axis; and said first operating means includes means for effecting reciprocating movements of said guide followers relative to said guide devices for selectively positioning said door in said first and second positions thereof.

6. The improvement according to claim 5, wherein said means for effecting reciprocating movements of said guide followers includes a fluid operated piston cylinder device having a cylinder part thereof fixed to one of said second ends of said support arms and said guide followers and a piston-rod portion fixed to the other of said second ends of said support arms and said guide followers.

7. The improvement according to claim 4, wherein said second operating means has a first end portion fixed for pivotal movement relative to said side wall about a fifth axis disposed parallel to said first axis and a second end portion coupled to said door by means providing for reciprocating movement of said door relative thereto incident to movement of said door between said closed and partially open positions and for pivotal movement relative thereto incident to movement of said door between said partially open and fully open positions.

8. The improvement according to claim 4, wherein said guide means includes a pair of stationary guide rails and a pair of door mounted trolley devices arranged to ride on said guide rails incident to movement of said door between said closed and partially open positions, said trolley devices being carried by said means for mounting said door on said second ends of said control arms.

9. The improvement according to claim 4, wherein said first operating means includes first means for effecting reciprocating movements of said door between said first and second positions thereof and second means for extending said control arms between said contracted and extended conditions thereof, and said first and second means are operably coupled to control the attitude of said door relative to said one end of said side wall, as said door is moved between said closed and partially open positions.

10. The improvement according to claim 9, wherein said first and second means are hydraulic cylinder devices having common ends thereof disposed in flow communication one with the other and opposite ends thereof alternatively, selectively coupled for flow communication with a hydraulic fluid source and sump, respectively.

* * * * *